United States Patent [19]

Heitmann et al.

[11] Patent Number: 4,837,624
[45] Date of Patent: Jun. 6, 1989

[54] RECOGNITION AND COMPENSATION OF ERRORS IN A DIGITAL VIDEO SIGNAL

[75] Inventors: Jurgen Heitmann, Alsbach-Hahnlein, Fed. Rep. of Germany; Peter Wagner, Bedford Hills, N.Y.

[73] Assignee: Robert Bosch GmbH, Stuttgart, Fed. Rep. of Germany

[21] Appl. No.: 45,693

[22] Filed: Apr. 30, 1987

Related U.S. Application Data

[63] Continuation-in-part of Ser. No. 928,542, Nov. 7, 1986, abandoned.

[30] Foreign Application Priority Data

Nov. 7, 1985 [DE] Fed. Rep. of Germany ....... 3539415

[51] Int. Cl.⁴ .............................................. H04N 5/14
[52] U.S. Cl. .................................... 358/166; 358/163; 358/336
[58] Field of Search ............... 358/166, 167, 163, 336, 358/37, 36

[56] References Cited

U.S. PATENT DOCUMENTS

| | | | |
|---|---|---|---|
| 4,090,221 | 5/1978 | Connor | 358/166 |
| 4,272,785 | 6/1981 | Fuhrer | 358/167 |
| 4,647,972 | 3/1987 | Strehl | 358/163 |
| 4,688,089 | 8/1987 | Uhlenkamp | 358/166 |

FOREIGN PATENT DOCUMENTS

3121310 12/1982 Fed. Rep. of Germany .

OTHER PUBLICATIONS

Digital Television Error Correction Without Overhead Bits, by A. A. Goldberg; et al., Television Technology in the 80's, pp. 80–88.

*Primary Examiner*—Tommy P. Chin
*Attorney, Agent, or Firm*—Frishauf, Holtz, Goodman & Woodward

[57] ABSTRACT

Digital video signals are subjected to band limiting by a high pass filter with a pass band terminating somewhat above half of the digital sampling frequency. The filtered signal is in effect subtracted from the original signal in an addition circuit with suitably phased inputs in order to make available a substitute signal of the interpolation low pass filtered kind. A circuit for determining the presence of an erroneous digital word accepts the high pass filtered signal, differentiates it twice and then digitally rectifies it in order to detect a possible maximum at half the sampling rate. When such a maximum is found, a changeover switch is caused to substitute the interpolation-low-pass-filtered signal for the orginal signal. Only a single digital filter is necessary for this operation. The high pass filter is a FIR filter of, for example, eleventh order and the middle coefficient is in effect changed from minus 1 to 0 when the delay equalized original signal is added to the output of the high pass filter.

5 Claims, 3 Drawing Sheets

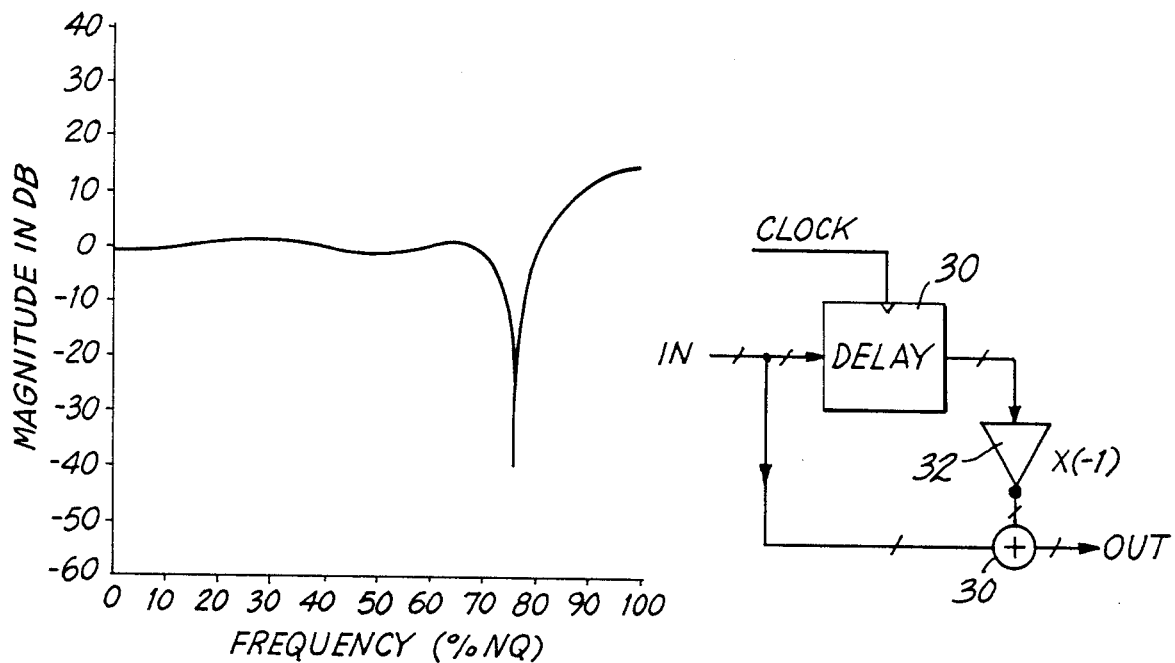
FIG. 4
FIG. 6
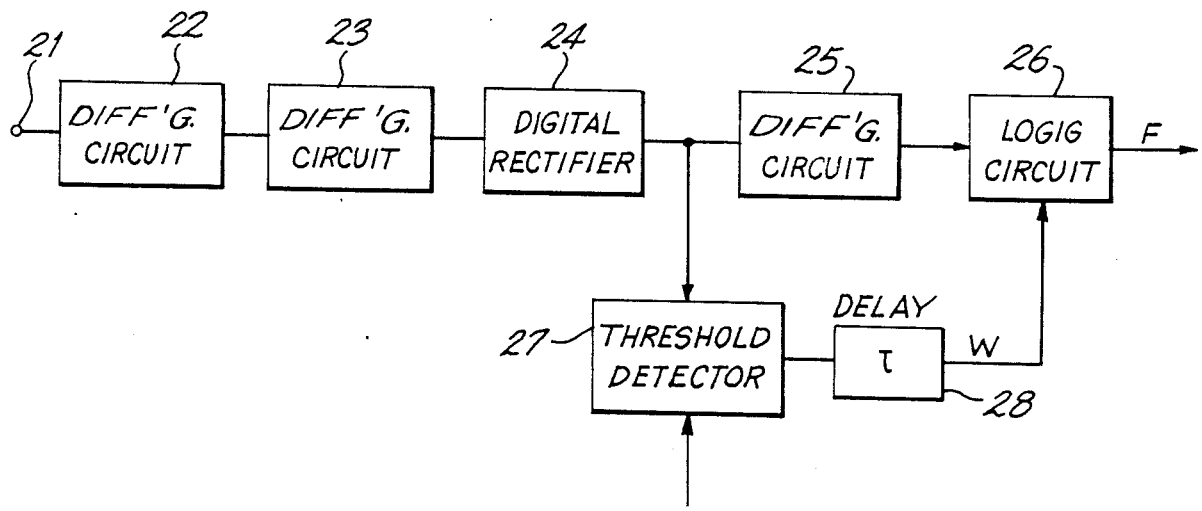
FIG. 5

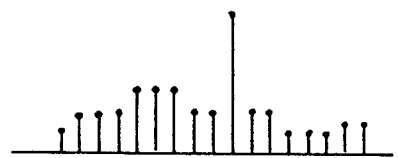
FIG. 7
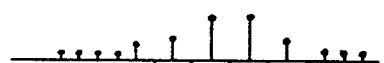
FIG. 8
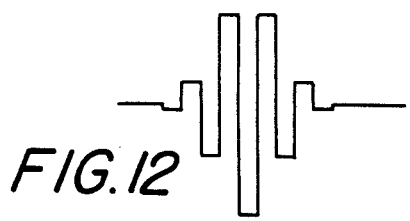
FIG. 12
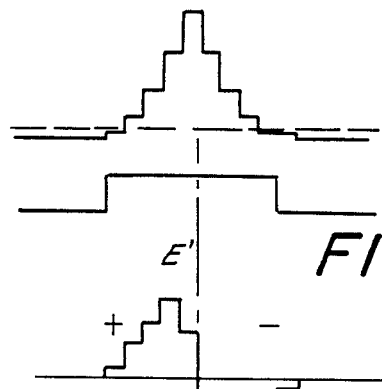
FIG. 13
FIG. 14
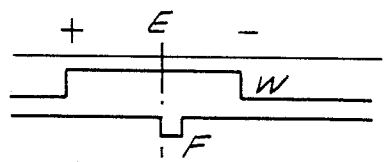
FIG. 15
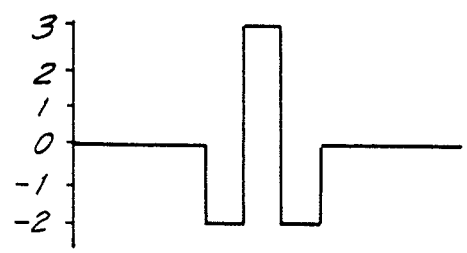
FIG. 9
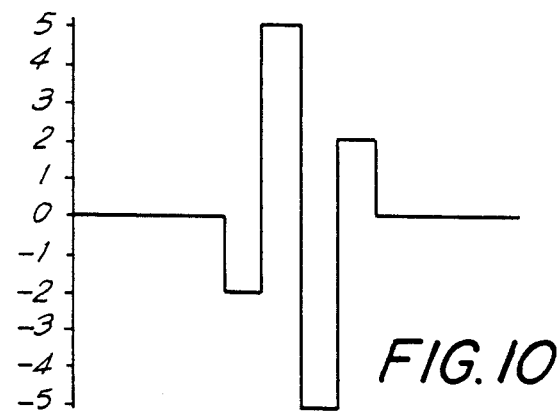
FIG. 10
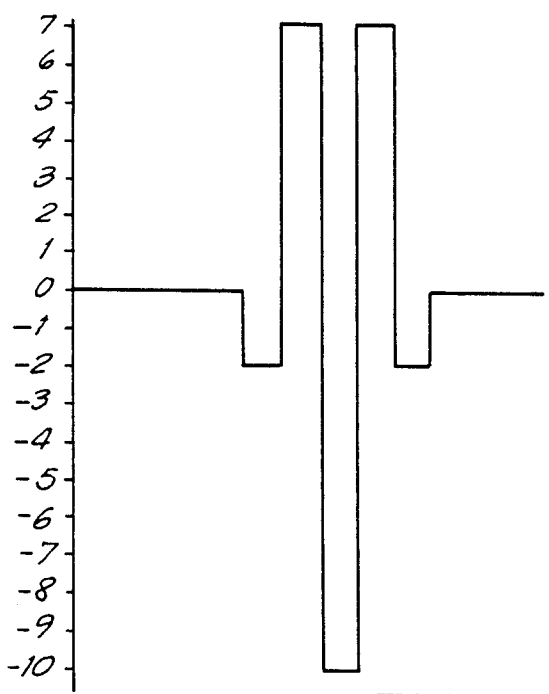
FIG. 11

RECOGNITION AND COMPENSATION OF ERRORS IN A DIGITAL VIDEO SIGNAL

This application is a continuation-in-part of application Ser. No. 928,542, filed Nov. 7, 1986, now abandoned.

This invention concerns the recognition and compensation of errors in digital video signals in which after the digital word for a picture element (pixel) is determined to be erroneous, a substitute pixel value is inserted which is derived by interpolation from the values of neighboring pixels.

A method of carrying out error compensation of the above-described kind is disclosed in an article by Goldberg and Rossi, "Digital Television Error Correction Without Overhead Bits" which was published in a special volume entitled "Television Technology in the 80's" at pages 80 to 88. That known method makes use of the fact that when a video signal limited in frequency by low pass filtering is digitally coded, energy maxima appear in the region of the sampling frequency and its multiples, while errors of a single bit generate noticeable amounts of energy in the region of half the sampling frequency, a region in which the undisturbed video signal, on the other hand, shows an energy minimum. Bit errors were accordingly recognized by measuring the energy content at half of the sampling frequency. Errors in bits of higher significance produce higher contribution to energy at half of the sampling frequency than errors of less significant bits. Consequently, the amplitude of a signal which is subject to band pass filtering at half of the sampling frequency makes it possible to determine the significance of the bits affected by errors.

The apparatus for error recognition according to that method accordingly has a digital to analog converter followed by equipment that includes an analog band pass filter having a transmission curve maximum at half the sampling frequency and a synchronous demodulator as well as a null transit detector for recognizing the location of the error in the demodulated low pass filtered and differentiated signal. The error correction device connected to this equipment changes the logical state of the bit recognized as erroneous and thereby corrects single-bit errors. In practice, however, there is great difficulty in providing reliable determination of the erroneously transmitted bit according to the two criteria of error time and error amplitude. The necessity of digital to analog conversion for determining the location of the error and the error magnitude is greatly disadvantageous.

It is also known from published German patent application DE-OS 31 21 310 to utilize digital filter structures for compensating errors in digital video signals, in which case a number of successive sample values are utilized for averaging. The low pass filter of nth order which is necessary for that purpose can be constituted by subtracting from the original signal a signal filtered through a high pass filter of nth order. Still another filter is necessary, however, for error recognition. This results in great circuitry expense.

SUMMARY OF THE INVENTION

It is an object of the present invention to reduce the digital filter expense of error recognition and compensation circuits of the above-described kinds and, in particular, to avoid, if possible, the difficult task of determining the location of individual bit errors.

Briefly, the digital video signal affected by errors is first subjected to high pass filtering for recognition of isolated errors by energy contributions to the high pass filtered signal in the region of half the sampling frequency and then, by subtraction of this high pass filtered signal from the input signal, a signal low pass filtered by interpolation is formed which can be used as a substitute value for use instead of the original signal on a word for word basis.

The invention has the advantage that substitution of one signal for another is done for word errors instead of for individual bit errors that are difficult to locate. The fact that the improvement of the signal is done by compensation or covering over of errors instead of by mathematically exact error correction is hardly visible in the reproduced picture and has the great advantage that by the system of the invention multiple bit errors, which are not correctable at all by the above-mentioned known methods, can be satisfactorily processed. There is the further advantage that the compensation for recognized errors according to the present invention can be carried out with little additional circuitry compared with other systems for substituting interpolated values for pixel values recognized to be erroneous.

It is particularly advantageous to carry out the recognition of error of magnitude and error location exclusively in the digital plane. It is also particularly advantageous to use the same filter structure both for recognition of the error and for obtaining an adequate substitution pixel value.

BRIEF DESCRIPTION OF THE DRAWINGS

The invention is further described by way of illustrative example with reference to the annexed drawings, in which:

FIG. 4 is a graph of the frequency characteristic of the concealment filter composed of the filter of Table I and the addition circuit 15 of FIG. 1;

FIG. 5 is a more extended circuit block diagram of the error or recognition and erroneous signal processing circuits of FIG. 1;

FIG. 6 is a block circuit diagram of a digital differentiator;

FIGS. 7 and 8 are graphical representations of signals with respect to time occurring in successive portions of the apparatus of FIGS. 1 and 2;

FIGS. 9, 10 and 11 are graphs illustrating the operations of the first and second differentiating circuits 22 and 24 of FIG. 5 by reference to a simple input signal (FIG. 9) at the input of the first differentiating circuit; and FIGS. 12-15 illustrate the operations of the circuits 22, and 24-27 with an input like FIG. 8.

DESCRIPTION OF THE ILLUSTRATED EMBODIMENT

Figure 1:
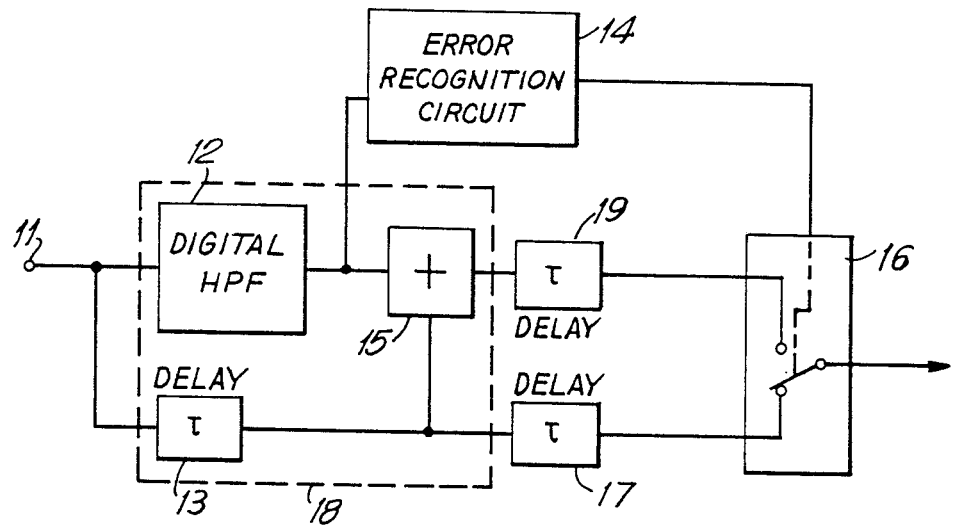
FIG. 1 is a circuit block diagram for recognition of and compensation for errors in a digital video signal in accordance with the invention.

In FIG. 1, the digital video signal, provided at an input terminal 11 by an analog to digital converter 10 having a predetermined sampling frequency, is supplied simultaneously, both to the input of a digital high pass filter 12 and to the input of a delay stage 13 equalizing the propagation time in the two circuit branches so constituted. The high pass filter 12 is constituted as a digital transversal filter of odd-numbered order in this illustrated case and has its output connected to the input of an error recognition and erroneous signal processing circuit 14 and also with the input of an addition stage 15. The second input of the addition stage 15 is connected to the output of the already mentioned delay circuit 13. The output signal of the delay stage is supplied to the addition stage 15 at a phase value which is opposed to the phase of the signal from the output of the high pass filter 12. Accordingly, the high pass filtered portion of the digital video signal is actually subtracted in the addition stage 15 from the original signal which has been adapted to this operation in propagation time by the delay circuit 13. The delayed input signal from the output of the delay stage 13 is for that purpose added to the high pass filtered signal at the output of the high pass filter 12. The amplification factor of a digital filter is normally equal to 1 in its pass band and in the illustrated circuit the amplification factor of the high pass filter in its pass band is chosen in such a way that the middle coefficient of minus 1 is provided. This leads to the result that the addition of the propagation time equalized input signal produces the effect of a low pass interpolation filter which is characterized by a middle coefficient of 0.

The high pass filter is constituted, for example, by a transversal filter of 11th order in which the coefficients are determined by the following table:

TABLE I

| K1 = +0.100242543 | |
|---|---|
| K2 = −0.325891316 | |
| K3 = +0.504178464 | for example |
| K4 = −0.764552474 | |
| K5 = +0.922943711 | |
| K6 = −1 | |
| K7 = K5 | |
| K8 = K4 | |
| K9 = K3 | |
| K10 = K2 | |
| K11 = K1 | |

The resulting output of the addition stage 15 is an interpolation-derived signal for substitution for an erroneous pixel value. This signal is supplied to one of the selectable contacts of a changeover switch 16, while the other selectable contact of that switch is supplied with the output of the delay circuit 13, both that output and the output of the addition stage 15 being supplied to the switch contacts through propagation time delay adjustment stages respectively designated 17 and 19. They delays are so adjusted to each other that their output signals are mutually coincident in time and so that the computation time of the error recognition and erroneous signal processing circuit 14 is compensated for.

The high pass filter 12, delay stage 13 and addition circuit 15 together thus form a interpolation-type low pass filter 18 indicated by the broken line rectangle in FIG. 1. This is not strictly a low pass filter because above its pass-band it has a "don't care" band instead of a stop band.

Table II gives another example of a transversal filter of the eleventh order that is suitable for use in the present invention.

K1 = +0.228
K2 = −0.430
K3 = +0.602
K4 = −0.830
K5 = +0.930
K6 = −1
K7 = K5
K8 = K4
K9 = K3
K10 = K2
K11 = K1

The calculation of these coefficients was performed without a dedicated algorithm. Attention was concentrated on providing an error-free interpolation of the video signal at DC (when the original signal is subtracted from the high pass filtered signal, as above described). It is of course possible that algorithms for reliably calculating suitable coefficients with wide ranging flexibility will be developed in the future.

Figure 2:
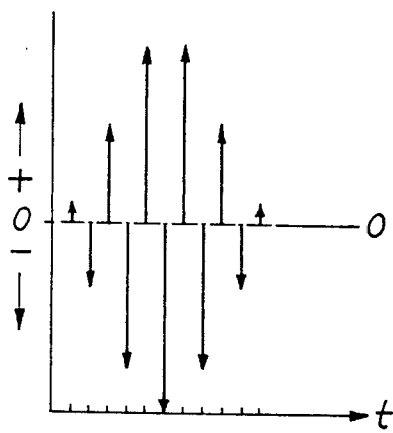
FIG. 2 is a graph of the impulse response of the filter of Table I (set forth below)
Figure 3:
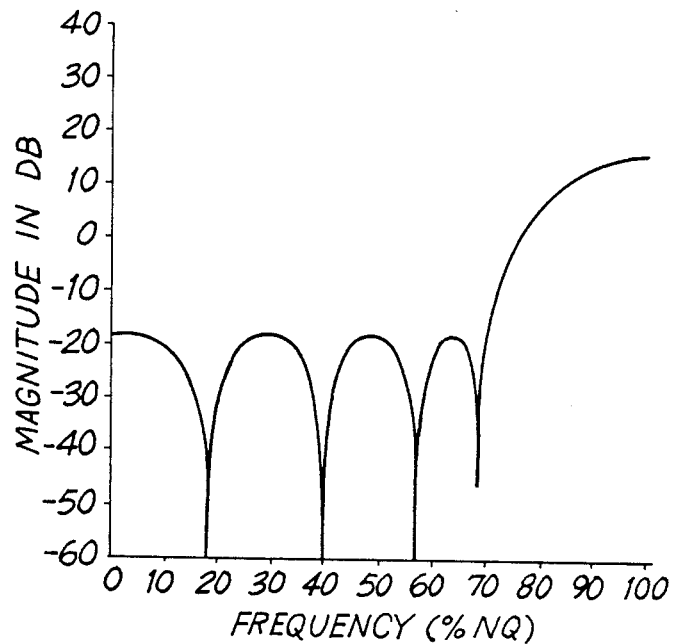
FIG. 3 is a graph of the frequency characteristic of the filter of Table I.

In order that the behavior of the digital filter 12 and the addition circuit 15 may be completely understood FIG. 2 shows the normalized impulse response of the filter of FIG. 2 having the coefficients given in Table I. FIG. 3 shows the frequency response of that filter plotting the magnitude in dB against the frequency with a frequency scale in terms of percentage of the Nyquist frequency NQ, which is half the sampling frequency. There is thus an attenuation range up to about 70% of the Nyquist frequency in which the original video signal is attenuated and a detection range for the error recognition circuit 14 of FIG. 1 between 705 and 100% of the Nyquist frequency, in which the error components in the signal are enhanced.

The impulse response of the concealment filter composed of the filter 12 with the coefficients of Table I and the addition circuit 15, differs from FIG. 2 only in that the middle component at the sixth time step is zero instead of minus one. The frequency response of this concealment filter is shown in FIG. 4 with a passband up to about 72% of the Nyquist frequency followed by a sharp cutoff and then a rebound at about 78% of the Nyquist frequency, so that this filter would amplify the noise of the video signal in this "don't case" band, but is assumed that there is no energy in the signal in this band as the result of the analog low pass filter that is normally used before analog to digital conversion which has a cutoff at two-thirds or less of the Nyquist frequency.

The digital video signal with compensated individual word errors is available at a selection terminal of the changeover switch 16 that leads to the output of the overall circuit of FIG. 1. When an error appears, the signal at the output of the error or recognition circuit 14 controls the changeover switch 16 in such a manner that when an error appears, the interpolation-low-pass-filtered signal from the output of the addition stage 15 is substituted for the propagation time equalized original signal from the output of the delay circuit 17.

FIG. 5 shows the error recognition circuit 14 of FIG. 1 as a spread out circuit block diagram. The high pass filtered video signal proceeds from the input terminal 21 successively through two digital differentiating stages 22 and 23. The repeated differentiation serves for narrower filtering and the elimination of DC components of the high pass filtered signal which could be present on accout of the finite cut-off damping of the high pass filter at the frequency f=0.

FIG. 6 shows the circuit of the digital differentiators used in the circuit blocks 22 and 23 of FIG. 5. The input digital words representing the video signal samples go to one input of the algebraic addition circuit 30 and also are delayed for one sampling interval (or actually half that much when all the samples are previously "stretched" to cover about one sampling period each) in the delay circuit 31 before going to the inverter circuit 32, the output of which goes to the other input of the algebraic addition circuit 30. The output of the algebraic addition circuit 30 then signifies the difference between successive sample words, actually subtracting the preceding word from the next one, the result differing only in sign from what would be obtained by subtracting the following sample from the preceding one. That change of sign is of course compensated for by another change of sign in the next differentiation stage that is constituted the same way.

The input to the first differentiating circuit of course is the output of the filter 12.

If we assume a video signal containing a single erroneous pixel value shown at P in FIG. 7, the output of the detector filter 12, having the characteristics shown in FIGS. 2 and 3 will correspond to FIG. 8, which shows a signal that is fairly close to the impulse response of the filter and differs therefrom only by some slight variation resulting from the non-erroneous samples of the original video signal.

The two stages of differentiation attenuate the small variations resulting from the non-erroneous portions of the video signal and accentuate the response to the error. This will be true even if the error does not take the sample P of FIG. 7 as far out of line with the other sample in FIG. 7 as is shown in this example.

For showing the effect of the successive differentiator circuits, a simpler example is assumed for the input to the first differentiator 22, as shown in FIG. 9. The output of the first differentiator 22 is shown in FIG. 10. The output of the second differentiator 23 is shown in FIG. 11.

The differentiators 22 and 23 of FIG. 5 can be operated with the group delay of half the sampling period each, so that the output of the second differentiator 23 is back in the timing grid of the rest of the system, with a total delay of one sampling period.

The critical part of the error detector circuit of FIG. 5 comprises the digital rectifier 24, the third differentiating circuit 25, the logic circuit 26 and the threshold detector 27. Their function will now be explained with reference to FIGS. 12-15.

FIG. 12 represents an output of the second differentiator 23 of FIG. 5 such as might be expected from a signal like FIG. 8 being supplied to the input of the first differentiator 22, instead of the much more simplified signal of FIG. 9 which was used as an example, to illustrate the operation of the first two differentiating circuits.

In the digital rectifier 24, the negative portions of the signal of FIG. 12 are replaced by positive values of the same absolute magnitude, resulting in a signal shown in the upper part of FIG. 13, which appears at the output of the rectifier 24 and is supplied therefrom to a threshold stage detector 27 which compares the signal amplitude of the rectifier output with a predetermined reference value represented by the broken line of FIG. 13, to produce a window signal corresponding to the wave form shown in the lower part of FIG. 13. After an equalizing delay in the delay unit 28 for equalizing the propagation time of a third differentiating circuit 25, this window signal is supplied to the control input of the logic circuit 26. The logic circuit 26 receives an output from the third differentiating circuit 25 of the form illustrated in FIG. 14. The third differentiating circuit 25 is constituted like the first and second differentiating circuits, as shown FIG. 6, in order to provide an output such as is shown in FIG. 14 from an input of the kind shown in the upper portion of FIG. 13. The output shown in FIG. 14 has a null transition at the instant designated by the vertical axis EE' which designates the time location of the erroneous signal sample P of FIG. 7.

The differentiating circuit produces a pulse in response to the null transition designated by the vertical line EE' of FIG. 14 through the logic circuit 26. If this pulse arrives within the duration of the window signal W as delayed by the circuit 28, the logic circuit provides an output error recognition signal F for operating the switch 16 of FIG. 1, transferring the output of the switch 16 from the output of the delay circuit 17 to the output o the delay circuit 19 for the correct amount of time for substituting the replacement signal value produced by the filter 18 of FIG. 1 for the erroneous value signal that is contemporarily presented by the erroneous value signal that is contemporarily presented by the delay circuit 17, and then promptly returning the switch 16 in time to make contact with the delay circuit 17 for receiving the following undisturbed pixel value signals.

The circuit of FIG. 5 is a digital circuit which is more effective for detecting energy maxima in the neighborhood of half the sampling frequency (i.e. in the neighborhood of the Nyquist frequency) than the previously used analog filters that required preliminary digital to analog conversion.

Although the invention has been described with reference to a particular illustrative example, it will be recognized that modifications and variations are possible within the inventive concept. For example, it is not necessary for the coefficients of the high pass filter 12 to have alternating signs. It is possible to design high class filters that do not obey the rule of alternating coefficient signs, although high pass digital filters are commonly designed to conform to that rule. Furthermore, the use of the first two differentiating circuits in the error recognition circuit of FIG. 5 could be dispensed with if the high pass filter 12 were of a kind having a more effective stop band. Also, the filter length can be shorter or longer and may, for example, be a 21st order instead of 11th in order to provide better concealment of erroneous pixel values.

We claim:

1. Method of recognizing and compensating for errors in a digital video signal composed of pixel-value digital words by replacement of a pixel value word recognized as erroneous with a substitute word derived by interpolation from values of neighboring pixels, comprising the steps of:

high-pass filtering an original digital video signal, which has been produced by digitally sampling an analog video signal in a converter at a predetermined sampling rate, in a digital filter having half said sampling rate within its passband and having its cut-off at a frequency lower than said sampling rate and thereby producing a high-pass filtered signal;

detecting energy maxima of said high-pass filtered signal and providing an error recognition signal in response to each of said maxima;

at least whenever said error recognition signal is present, subtracting said high-pass filtered video signal from the original digital video signal to produce a low-pass filtered video signal providing an interpolation-derived substitute digital word corresponding to a word of said original digital signal, and in response to each said error recognition signal substituting said substitute digital word for said digital word of said original digital signal which is related to said error recognition signal.

2. Method according to claim 1, wherein said digital filter is a transversal filter of odd order having a middle filter coefficient and equipped with means for setting the middle coefficient thereof at minus 1 to produce said subtracting step in response to the presence of said error recognition signal, wherein the combination of said high-pass filtering and addition of the input of said digital filter equalized for propagation time to the negatived product of said middle coefficient produces the behavior of an interpolation low-pass filter having a middle coefficient which is effectively set to zero.

3. Method according to claim 2, wherein the step of detecting said energy maxima is performed by detecting amplitude maxima of said high-pass filtered signal occurring substantially at half of said sampling rate.

4. Apparatus for recognizing and compensating for errors in a digital video signal composed of pixel value digital words by replacement of a pixel value word recognized as erroneous with a substitute word derived by interpolation from values of neighboring pixels, said digital video signal having a predetermined sampling rate, comprising:

high-pass transversal digital filtering means connected to a source of said digital video signal for passing, to an output of said filtering means, components of said digital video signal in the neighboring of half of said predetermined sampling rate and for blocking from said output components of said video signals in the neighborhood of said predetermined sampling rate;

means connected to said output of said high-pass filtering means for detecting energy maxima of the output signals of said filtering means and for providing an error recognition signal in response to each of said maxima;

means for subtracting the output signal of said high-pass filtering means from a delay-equalized replica of said digital video signal provided as an input to said filtering means, in order to produce a low-pass filtered video signal made up of interpolation-derived substitute digital words, and selector switch means operable in response to each said error recognition signal provided by said detecting means for substituting one of said interpolation-derived substitute words produced by said subtracting means for a digital word of said digital video signal provided as an input for said high-pass filtering means which word is related to the same said error recognition signal.

5. Apparatus according to claim 4, wherein said high-pass transversal digital filter is of uneven order and has a middle filter coefficient of minus 1 at least during the presence of said error recognition signal produced by said detecting means and wherein said subtracting means is constituted by addition means which, by virtue of said minus 1 middle coefficient of said filter, provides a subtraction yielding said interpolation-derived substitute digital word for said digital word of said digital video signal supplied as said input to said filtering means.

* * * * *